Feb. 5, 1929. 1,701,443
P. L. CROWE
PERIPHERAL MOTOR MACHINE
Filed July 19, 1926  3 Sheets-Sheet 1
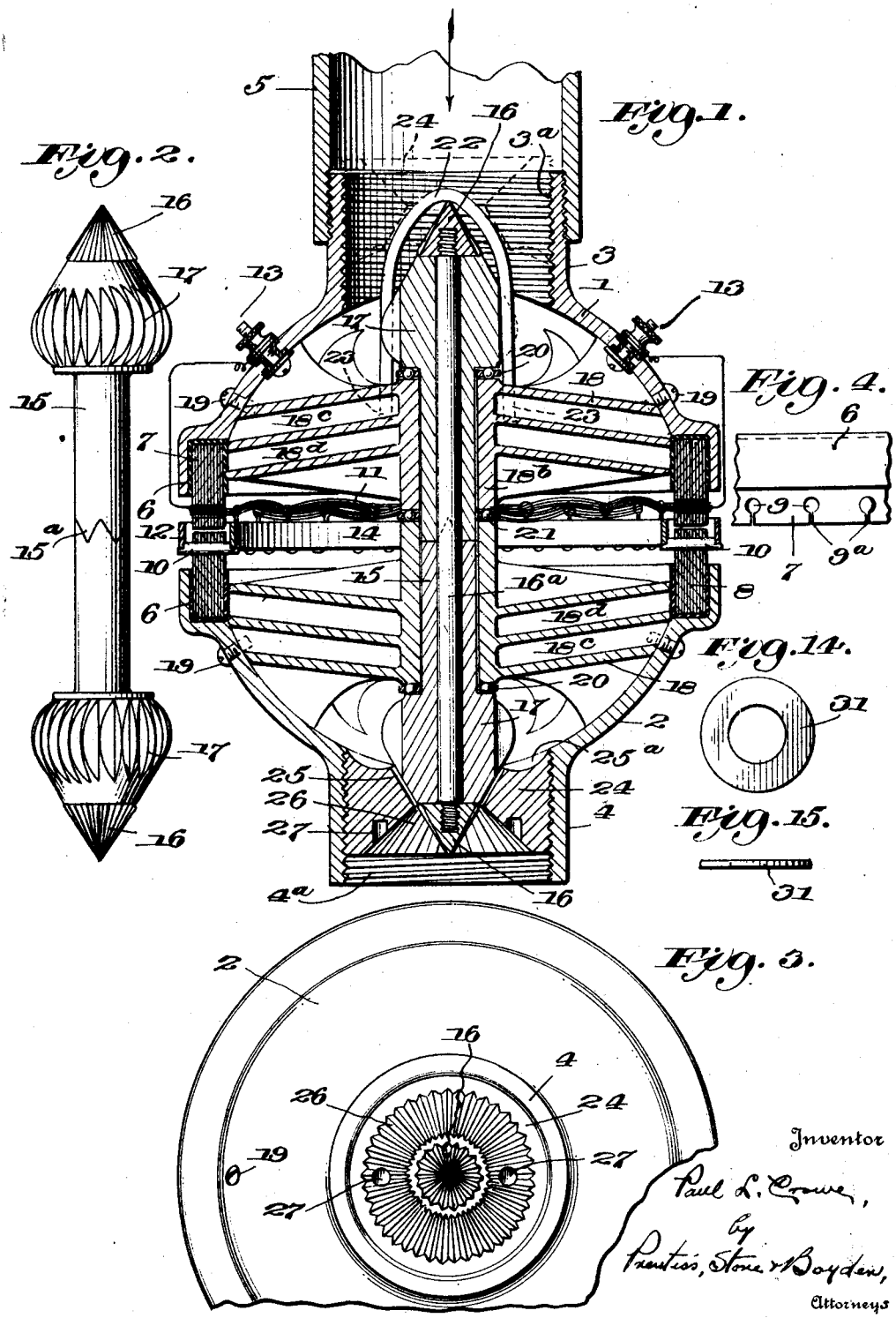
Inventor
Paul L. Crowe,
by
Prentiss, Stone & Boyden,
Attorneys

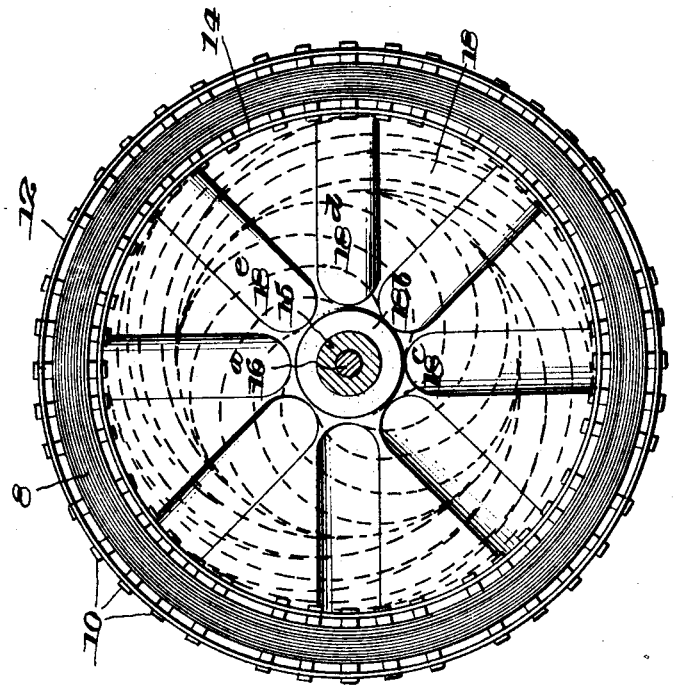
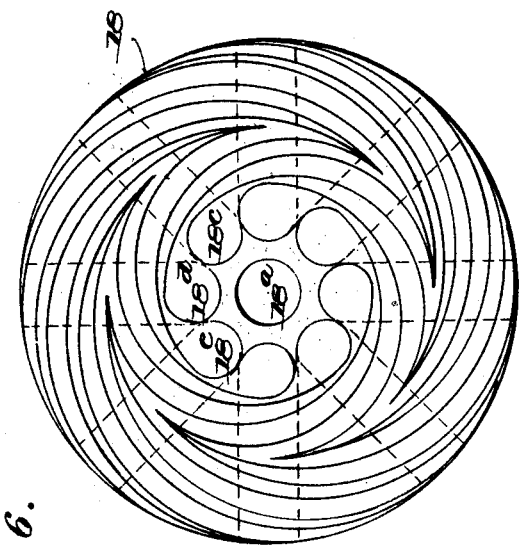
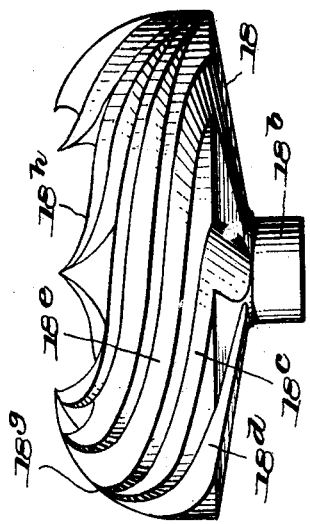

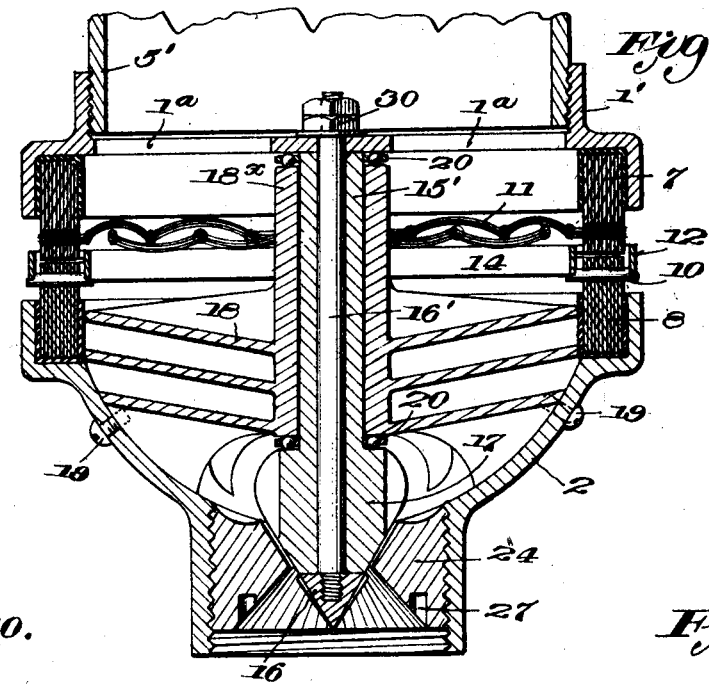
Fig. 9.
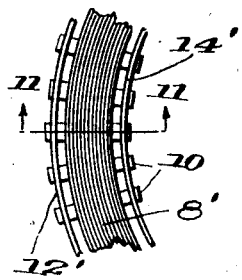
Fig. 10.
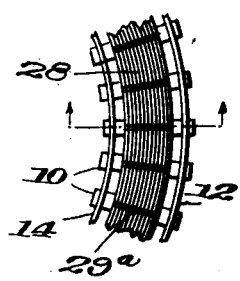
Fig. 12.
Fig. 16.
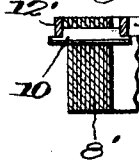
Fig. 11.
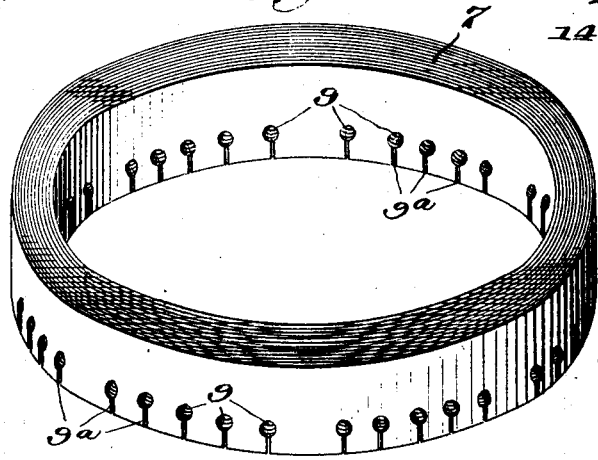
Fig. 8.
Fig. 13.

Patented Feb. 5, 1929.

1,701,443

UNITED STATES PATENT OFFICE.

PAUL L. CROWE, OF BALTIMORE, MARYLAND.

PERIPHERAL MOTOR MACHINE.

Application filed July 19, 1926. Serial No. 123,519.

This invention relates to electrically driven machines in general, and more particularly to peripheral electric grinders or crushers.

Heretofore, machines of this character have been driven by means of electric motors either geared or belted thereto, and this frequently gives rise to difficulties as to space and mounting, and to various mechanical complications.

One of the objects of the present invention is to simplify and improve electrically operated machines, and at the same time reduce their cost of construction and render them more compact. To this end, I propose to entirely avoid the use of a separate motor by building the motor as a structural part of the machine to be driven. This motor preferably takes the form of co-operating annular members mounted at the periphery or largest diameter of the rotary machine to be driven. In this way, the central portion or space within the annular members or rings is left free for the accommodation of the grinding or other mechanism being operated.

A further object is to so construct the annular members, that such members or rings for the stator and rotor shall be demountable and interchangeable, whereby motor rings having any desired type of winding may be assembled on any particular machine, as required.

Another object of the invention is to provide an electrically driven grinding machine which is provided with two sets of grinding elements, either of which may be used, at will, and which is reversible in space, so that it may be operated either end up, as desired.

Still another object of the invention is to construct a combined fan or blower and material feeding device, and so arrange this fan within the grinder casing that it serves to create an air blast to force the material through the grinder and carry the pulverized material from the grinder through a discharge pipe.

Figure 1 is a central vertical section through my improved motor driven machine showing one embodiment of the invention;

Figure 2 is a side elevation of my improved grinding spindle;

Figure 3 is an inverted plan view of the device shown in Figure 1, parts being broken away;

Figure 4 is a fragmentary side elevation showing one of my improved motor rings;

Figure 5 is a plan view of the lower half of the machine shown in Figure 1, the central shaft being shown in section;

Figure 6 is a plan view of my improved fan member alone;

Figure 7 is a side elevation of such fan member;

Figure 8 is a perspective view of one of the magnetic rings which I employ in constructing my improved motor;

Figure 9 is a view similar to Figure 1, but showing a modified construction;

Figures 10 and 11 are fragmentary plan and transverse sectional views respectively, illustrating a slightly modified construction of one of the motor rings or elements;

Figures 12 and 13 are similar views showing a still further modified arrangement of motor elements;

Figures 14 and 15 are plan and edge views respectively, of a bearing washer which I may employ, if desired; and Figure 16 is a transverse section through a modified grinding element which I may employ in connection with the device shown in Figure 9.

Referring to the drawings in detail, the illustrated embodiment of my improved electric motor driven grinding machine comprises a pair of opposed cup-shaped or bowl-shaped casing members 1 and 2, arranged on a common vertical axis. Extending axially from these casing members are necks 3 and 4, both of which are internally screw threaded with threads of the same pitch, as indicated at 3ª and 4ª, and the upper neck 3 is preferably also externally screw threaded to receive the end of a delivery pipe or conduit 5. This pipe or conduit 5 being fixed or stationary serves as a support to which the grinding machine is attached and from which it is suspended.

At the opposed adjacent edges of the two cup-shaped casing members 1 and 2 are provided annular flanges 6, forming seats for the reception of my improved magnetic rings or motor elements. These elements are designated at 7 and 8, and comprise rings firmly mounted within the flanges 6 of the respective casing members and disposed in parallel planes with their adjacent edges spaced slightly apart to constitute an air gap.

One of these members, such as the member 7, is shown in perspective in Figure 8, and by reference to this figure, it will be seen that the ring comprises a laminated structure formed by coiling up a ribbon of magnetic material such as soft iron. An annular series of radially extending openings 9 is formed through the ring 7, adjacent the lower edge thereof, and slots 9ª preferably extend from these openings to the lower face of the ring. These openings and slots are also shown in Figure 4.

In the openings and slots thus formed, is placed a suitable winding of insulated wire, the exact nature of which forms no part of my invention. This winding may be two-phase or three-phase, but, for small machines, is preferably single-phase, and is wound in the openings and slots, as indicated at 11, in Figure 1, in such a manner as to produce any desired number of poles. Where single-phase is employed, the winding is preferably arranged as a split-phase winding in a manner well known in the art, so as to render the motor self starting. The terminals of the winding are brought out and secured to insulated binding posts 13, to which the current leads may be connected. In the embodiment shown, the ring 7, with its winding, constitutes the stator element of my improved motor.

The peripheral rotor element comprises a magnetic ring 8, substantially similar to the ring 7, except that the slots 9ª, extending from the radial openings to the face of the ring, may be omitted. In these radial openings are set conductor bars 10, the outer and inner ends of these bars being united by "end rings" 12 and 14, thus constituting, in effect, a "squirrel cage armature". This is best illustrated in Figure 5.

The rotor and stator constituting my improved motor, as above described, are mechanically united and held in operative relation by means of a central spindle 15, formed in two sections, rigidly connected by means of an interlocking joint, as shown at 15ª in Figure 2. This spindle is hollow and the sections are held together by means of a rod 16ª, extending longitudinally therethrough from end to end, and provided at its ends with screw threads which are engaged by conical caps or nuts 16. At each end of the spindle 15, adjacent the nuts 16, is formed a grinding member 17, preferably conical in form, and constituting a continuation of the conical nut 16. The nuts 16 and grinding members 17 have suitable grinding teeth or serrations formed on their outer surfaces in the usual or any desired manner.

Mounted within and substantially filling the interior of each casing member 1 and 2 is a special fan device 18, best shown in Figures 5, 6 and 7. These fan devices are reversely arranged and their outer periphery is spherical, as indicated at 18ᵍ in Figure 7, so as to fit snugly within the bowl-shaped casing members. Each fan device is provided with a central opening 18ª, adapted to snugly fit the spindle 15, and with a hub member 18ᵇ adjacent one end. When seen in end elevation or plan, as shown in Figure 5, each fan device is provided with a plurality of radial slots 18ᶜ, 18ᵈ, 18ᵉ, etc., and each of these slots extends spirally through the body of the fan device. As shown in Figure 7, each slot extends substantially 180° around the axis, but the exact inclination of the slots is not important and may be varied, as found most suitable. The end of the fan device opposite the hub 18ᵇ is somewhat concave, as indicated at 18ʰ in Figure 7, and as shown in Figure 1. By reference to Figure 6, it will be seen that the slots above referred to extend out through this concave end, so that these slots are completely open from one end to the other. The sides of the slots are closed by the walls of the casing members 1 and 2.

It will be understood that the fan devices are mounted within and rigidly secured to the respective casing members 1 and 2, as by means of screws 19. The hub portions of the fan devices are assembled on the spindle 15, as shown in Figure 1, and anti-friction bearings 20 are interposed between the end of each fan device and the adjacent grinder head 17, while a similar anti-friction bearing 21 is interposed between the meeting ends of the two hub portions 18ᵇ of the fans, all as shown in Figure 1.

As so far described, the spindle 15, with its grinding heads, is free to revolve inside of the upper fan device 18, which is carried by the fixed casing 1. When the apparatus is arranged as illustrated in Figure 1, however, it is necessary to lock the spindle 15 and grinding heads against rotation, and this is accomplished by means of a U-shaped locking key 22, which is slipped down over the upper grinder head 17 and enters sockets 23, formed in the upper fan device. The arms of the U-shaped key engage the flutes or corrugations at the sides of the grinding head and thus hold it rigid with the upper fan device.

While I have referred to the devices shown in Figures 5, 6 and 7 as fan devices, it will now be understood that one of these devices does not rotate, but remains stationary and serves simply as a feeding device or distributor through which the material flows. As shown in the drawing, the upper one is stationary but obviously either one may be arranged to rotate, while the opposite one remains stationary.

In order to effect the grinding or pulverizing of the material, I provide a grinding member 24, constructed to cooperate with one of the grinding heads 17. As shown in Figure 1, this grinding member 24 is in the nature of a cylindrical block, provided on its outer surface with threads adapted to engage the threads 4ª of the neck 4 of the casing.

The member 24 is also provided with sockets 27 to receive a suitable wrench by means of which it may be screwed into the neck portion 4 to the desired extent.

This grinder member is provided with a central tapering opening having suitable teeth or corrugations 25, and is also formed on its upper surface around such opening with radially extending flutes or corrugations 25$^a$, all of these teeth or corrugations constituting grinding surfaces adapted to cooperate with the complementary grinding surfaces on the head 17.

The operation of the device may be described briefly as follows. Suitable alternating current being supplied to the binding posts 13 will pass through the winding 11 and will set up in the upper magnetic ring or stator 7, a rotating field. This, in turn, will induce currents in the conductor bars 10 of the squirrel cage structure carried by the lower ring or armature 8, and this armature will thus be caused to revolve. With the armature 8, the lower casing member 2, and the lower fan device 18 contained therein, also rotate, while the central spindle 15, with its two grinding heads, remains stationary.

Granular material to be pulverized, such, for example, as coal, being fed through the pipe or conduit 5, passes down into and through the upper fan or distributing device 18 and flows thence into the revolving lower fan device. From the open lower ends of the slots of this fan device, the material issues and is subjected to the crushing and grinding action of the fixed grinder head 17, and the cooperating rotary grinding member 24. The material is pulverized and passes down between the two grinding members and is discharged from the machine.

As above intimated, the grinding member 24 is made so as to be interchangeable between the necks 3 and 4. If, therefore, it be desired to grind at the upper end of my improved machine, rather than at the lower end, as described, the following change is made. The grinding member 24 is unscrewed and taken out from the neck 4, and the key 22 is removed from the position shown in Figure 1, and is inserted in a similar position at the lower end of the spindle. This locks the spindle and grinding members to the lower casing member and causes them to rotate with it. The grinding member 24 is then screwed into the upper end of the neck 3, as shown in dotted lines in Figure 1, and is adjusted until it is the proper distance from the upper grinder head 17. The face of the grinding member 24, opposite the flutes 25$^a$, is preferably formed with a conical depression, as shown, and the walls of this depression are corrugated or provided with grinding teeth, as indicated at 26. When, therefore, the grinding member 24 is screwed into the upper neck 3, the grinding surface 26 cooperates with the conical cap or nut 16 at the upper end of the spindle to effect a crushing and grinding operation. The crushed material then passes down between the grinding head and the grinding surface 25 of the member 24, and is further pulverized or comminuted. The powdered material from the grinding members then passes down through the stationary and rotary fan or distributing members 18, and out through the open lower end of the casing. It will thus be seen that grinding may be accomplished at either the upper or lower end of the device, as desired, and that the grinding member 24, and locking key 22, may be mounted at either end of the casing, as required.

The rotary fan device 18 mounted in the casing member 2, tends to set up air currents which serve to force the material down through the grinding device, and it also serves to draw air in through the air gap between the rotor elements so as to prevent the escape or accumulation of dust at this point, and keep the motor cool.

While I have shown and described a grinding device comprising two similar ends, either one of which may be used for grinding, I may embody the same principle in a single grinding device in a simple machine having only a single grinding device. This is shown in Figure 9, in which, instead of the upper casing member 1, I provide merely an attaching ring 1', having a spider 1$^a$ extending across the same and adapted to support the central shaft 16' by means of nuts 30. The spindle 15' is made shorter, and the fan device 18 is provided with an elongated hub 18$^x$, which engages the anti-friction bearing 20. A delivery pipe 5' is screwed into the connecting ring 1'.

While in Figure 1 I have shown the end rings 12 and 14 as extending up beyond the air gap between the motor elements, I may make these rings flush with the surface of the magnetic member, if desired, as shown in Figures 10 and 11.

Also, while I have described the motor elements 7 and 8 as each provided with either a winding or a squirrel cage structure only, I may, in some cases, provide a motor element such as 28 in Figures 12 and 13, both with a squirrel cage structure 10, 12, 14, and with openings 29 and slots 29$^a$, in which a winding may be placed. A motor element constructed in this manner might be employed for either a stator or rotor as desired, the element, when used for a rotor, having winding short-circuited on itself to aid the action of the squirrel cage structure.

While in Figures 1 and 9 I have shown the use of ball bearings 20 and 21, I may, if desired, employ the so-called oilless bearings instead, as shown at 31 in Figures 14 and 15.

In Figure 16, I have illustrated a modified construction of grinding member, designated 24', and having an upper fluted surface 25'. This grinding member may be employed in place of the member 24, in some cases.

What I claim is:—

1. A grinding machine comprising a bowl-shaped casing mounted to rotate on a vertical axis, grinding members at the lower end of said casing, a fan member secured to the inside of and substantially filling said casing above said grinding members, a fixed top or cover above said casing, means for feeding material to be ground down through said cover onto said fan member, and co-operating electric motor elements carried by said casing and cover, respectively.

2. A grinding machine comprising a casing formed of a pair of opposed similar cup-shaped members mounted on a common vertical axis, the upper member being fixed and the lower, rotary, stator and rotor elements of an electric motor carried by the adjacent edges of said fixed and rotary members respectively, and co-operating fixed and rotary grinding members at the bottom of the lower cup.

3. A grinding machine comprising a casing formed of a pair of opposed similar cup-shaped members mounted on a common vertical axis, the upper member being fixed and the lower rotary, rotor means carried by said members whereby the lower is driven, a spindle extending centrally through said casing and carrying a grinding member at each end, and means whereby a co-operating grinding member may be mounted adjacent the grinding member at either end of said spindle, as desired.

4. A grinding machine comprising a casing formed of a pair of opposed similar cup-shaped members mounted on a common vertical axis, the upper member being fixed and the lower rotary, motor means carried by said members whereby the lower is driven, a spindle extending centrally through said casing and carrying a grinding member at each end, means whereby said spindle may be locked to either the fixed casing member, to remain stationary, or to the rotary casing member, to rotate therewith, and means whereby a complementary grinding member may be mounted in either the fixed or rotary casing member to co-operate with either grinder carried by said spindle, as desired.

5. A grinding machine comprising a casing formed of a pair of opposed similar cup-shaped members mounted on a common vertical axis, the upper member being fixed and the lower rotary, motor means carried by said members whereby the lower is driven, a spindle extending centrally through said casing and carrying a grinding member at each end, means whereby said spindle may be locked to either the fixed casing member, to remain stationary, or to the rotary casing member, to rotate therewith, a complementary grinding member, and means whereby said complementary grinding member may be mounted in the fixed casing member to co-operate with the upper spindle grinder, when the spindle is locked to the rotary casing member, or be mounted in the rotary casing member to co-operate with the lower spindle grinder when the spindle is locked to the fixed casing member.

6. The combination with a machine having a rotary casing, and a shaft on which it is supported, of an electric motor element peripherally mounted on said casing, a co-operating electric motor element mounted on a fixed support adjacent said first element, said motor elements being spaced from said shaft to provide between themselves and the shaft a channel through which material may pass, and material treating mechanism mounted within said casing.

7. The combination with a machine having a rotary casing, of an electric motor element peripherally mounted on said casing, a co-operating electric motor element mounted on a fixed support adjacent said first element and in a plane parallel therewith, but spaced axially therefrom, and material treating mechanism mounted within said casing, and encircled by said motor elements.

8. The combination with a machine having a rotary, bowl-shaped casing, of an annular electric motor element removably mounted on the rim of said bowl-shaped casing, a second annular electric motor element mounted on a fixed support adjacent said first element, said annular motor elements having an entirely free and unobstructed interior, and material treating mechanism enclosed within said casing and electric motor elements.

9. The combination with a machine having a casing comprising opposed cup-shaped fixed and rotary members mounted on a common axis, and parallel annular electric motor elements removably mounted at the adjacent edges of said cup-shaped members, said electric motor elements having no part projecting into the interior of said cup shaped members, and material treating mechanism enclosed within said cup shaped members.

10. The combination with a machine having a casing comprising a pair of hollow members mounted for relative rotation about a common axis and with their edges adjacent, co-operating annular electric motor elements carried by said adjacent edges, mechanism within said casing for feeding and treating material, means at one end of said casing for delivering to the feeding mechanism the material to be treated, and means at the other end of said casing for discharging the treated material.

In testimony whereof I affix my signature.

PAUL L. CROWE.